Patented June 7, 1938

2,119,981

UNITED STATES PATENT OFFICE 2,119,981

PROCESS FOR CONVERTING STARCHY RAW MATERIALS USED IN DISTILLING, ETC.

Gerald C. Baker, Peoria Heights, Ill., assignor to Premier-Pabst Corporation, Peoria Heights, Ill., a corporation of New Jersey No Drawing. Application December 28, 1935, Serial No. 56,531

1 Claim. (Cl. 195—23)

The invention relates to a process for converting cereal or unmalted, non-diastatic starchy raw materials, such as used in distilling, brewing, the making of vinegar, and the making of yeast.

Heretofore in converting unmalted starchy raw materials diastatic malt has been largely used by the industries mentioned above. In malting, wheat or barley, but most frequently barley, is first steeped and washed in water to remove dirt, scum, and organisms which inhabit the surface of the grain in exceedingly large numbers. No matter how thorough this cleaning, organisms of different species still remain on the surface of the steeped grain and multiply during germination which is terminated by drying of the sprouted grain in kilns as soon as the maximum of diastatic power has been created and other desirable changes have taken place. No matter how careful malting is conducted, the diastatic power of the finished malt is limited and under the most favorable conditions does not exceed 190° Lintner and in most instances falls below. The kiln drying of the sprouted grain is conducted at low temperature levels that do not destroy these unwanted germs so that where ever low mashing temperatures are employed, these germs or organisms are introduced through the malt and develop and multiply during the subsequent fermentation process. These germs are responsible for the creation of products other than ethyl alcohol, viz., aldehydes, ethers and esters, acids and fusel oils which are by-products, not wanted and constitute a loss of yield. Thus diastatic malt as used heretofore in the industries above described is of limited power and has organisms which, due to its relatively raw condition, affect both its keeping qualities and its reaction on the starchy materials which it is desired to convert into sugar.

Since the usual malt diastase solution or malt infusion is a relatively unstable product, it is usually produced by the distiller, brewer or other user, and this necessitates the operation of considerable equipment for transporting, cleaning, grinding, and mashing of malt.

According to the present invention, the conversion of the starchy materials in the above industries is made by subjecting such materials in a gelatinized and pasteurized condition to the action of a high diastatic malt extract or syrup as the diastase-bearing material with a diastatic power of 350° to 480° Lintner and in a stable condition so that the surface organisms and others previously referred to are impotent so that it will keep for relatively long periods of time without danger of spoilage and so that the unwanted organisms will not produce unwanted aldehydes, ethers and esters, etc., which may unfavorably affect the aroma, taste and boquet of the product. Also this converting material is ready for instant use in a concentrated form, thus eliminating the usual malt processing equipment. Furthermore, the converting power is immediately available and active as soon as it comes into contact with gelatinized starch, whereas that of malt must first be brought into solution and loses some of its strength while this takes place. It has been found that the high diastatic malt converts more sugar than that obtained with the usual malt diastase because there is no unconverted starch carried by the syrup.

The invention further includes the process hereinafter described and more particularly defined by the claim at the conclusion hereof.

With the ordinary malt extract or syrup much of the starchy matter is converted during the extraction of the diastase, and this reduces the yield of the extracted diastase and also as pointed out above introduces unwanted conversion products in the syrup or extract. Where ordinary diastatic barley malt is used, it is usually cleaned and milled and treated to produce a watery diastase-bearing infusion which does not have the conversion power or the boquet imparting qualities of high diastatic malt syrup or the keeping qualities thereof and involves the use by the converter, of grain cleaning and milling equipment.

According to the present invention, a diastase-bearing infusion is made from diastase-bearing malted grain, preferably barley with as high a content of diastase as possible and concurrent conversion of as little starchy matter as possible. For accomplishing this the malted grain is finely ground in attrition or other suitable milling equipment and mashed with water at temperatures below the usual saccharifying temperatures, 130° to 140° Fahrenheit, for a period of thirty minutes and separation of the liquid portion of the mash from the solids then made in as quick a time as possible, preferably by filtration, although lautering or separation in vessels with false bottoms might be used. It is important to make the separation of the wort from the grains as quickly as possible, as it has a bearing on the quality of the product produced and prevents concurrent conversion materially. By the expression "as quickly as possible" I mean about one hour separating time for the filter operation and two and one-half to four hours time for the lautering operation if used, though it has been found that the filter press method of separation is superior. This extraction of the diastase from the malt is carried out under the conditions mentioned above and with water of definite composition, that is water preferably of five to twenty grains total hardness.

This wort or diastase-bearing infusion is then concentrated to remove the water therefrom and produce a syrup having a total solid content of seventy to eighty per cent dry or solid matter. This solid matter is composed of pre-existing soluble materials of the malt embodying its diastatic power. They run high in fermentable sugars, and their diastatic strength is from 350° to 480° Lintner which is as much converting power as contained in four to five times the equivalent weight of diastatic malt. The concentration is effected by evaporation of the diastase-bearing infusion in vacuum and in a relatively high vacuum of 27½ to 28 inches and which may be done at a low temperature, for example, not over 110° Fahrenheit and leaves the diastase-bearing material in a liquid condition. Organisms which are present are, under this treatment, killed either through a concentration of their body material causing changes that will not support any life functions or possibly through bursting of their membrances through excessive expansion. This highly concentrated diastatic malt extract thus produced is stable without being pasteurized, and it may be preserved as by barreling or canning, so that it will keep for long periods of time and is available to the converter for instant use without any preliminary treatment.

For effecting a conversion 12½ to 15% of this high diastatic malt syrup or extract is mixed with 87½ to 85% of gelatinized starchy material at suitable temperatures, for example, 140° to 158° Fahrenheit and is immediately available and acts as soon as it comes in contact with the gelatinized starch to liquefy the same and convert the starchy material into the usual maltose, maltose dextrins, and dextrins, the composition depending upon the temperature employed as is normally the case with barley malt. The gelatinized starchy material may be prepared from unmalted starchy raw materials, such as corn, corn grits, rice grits, ground rye and rye derivatives, corn and rice flakes, refined starch, etc., by heating the same slowly at 150° to 160° Fahrenheit for fifteen minutes and then boiling the same for thirty minutes or until the raw starch has been gelatinized. Under these conditions also the raw starch is in a pasteurized condition and, therefore, cannot contribute any infection to the mash while the high diastatic syrup has had any foreign infection-producing organisms rendered impotent as previously described so that the conversion may be carried out under what might be termed the purest conditions. In the case of distilling and brewing, it has been found to be of advantage to cook with the raw starchy materials during gelatinizing a small amount of high diastatic syrup approximately five per cent by weight of the starchy material to be converted.

It has been found that by treating gelatinized starchy material with high diastatic malt syrup as herein described there is an increase of ten per cent or more in converting power over ordinary diastatic barley malt; less plant equipment is needed by the converter, as he requires no apparatus for processing the malt extract for converting; the syrup can be added to the mash at conversion temperatures, thus eliminating the time required for mashing of malt at low temperatures. This high diastatic malt extract exerts a greater proteolytic action during mashing than diastatic malts and thus provides the yeast with a large amount of nitrogenous food and prevents contamination of the mash with undesirable organisms which subsequently in the case of conversion of the sugar to alcohol and alcoholic beverages affects its taste and boquet.

What I claim as my invention is:

That improvement in the art of converting starchy materials to sugars used in distilling, brewing, and the like which consists in making a diastase-bearing mash below 130° to 140° Fahrenheit, separating the liquid portion of the mash from the solids in as quick a time as possible to prevent concurrent conversion, concentrating the infusion thus produced by evaporation under a vacuum of twenty-seven and one-half to twenty-eight inches at a temperature not exceeding 110° Fahrenheit to purify the same and to bring the diastase containing solid content thereof to 70% to 80% of the total weight of the concentrate and to a strength of 350° to 480° Lintner and mixing this concentrate with starchy materials in a gelatinized pasteurized condition to saccharify the resulting mixture.

GERALD C. BAKER.